(12) United States Patent
Li et al.

(10) Patent No.: US 10,698,258 B2
(45) Date of Patent: Jun. 30, 2020

(54) LIQUID CRYSTAL DISPLAY DEVICE AND SPLIT-TYPE BACKLIGHT MODULE

(71) Applicant: HUIZHOU CHINA STAR OPTOELECTRONICS TECHNOLOGY CO., LTD., Huizhou, Guangdong (CN)

(72) Inventors: Dehua Li, Guangdong (CN); Gang Yu, Guangdong (CN)

(73) Assignee: HUIZHOU CHINA STAR OPTOELECTRONICS TECHNOLOGY CO., LTD., Huizhou, Guangdong (CN)

( * ) Notice: Subject to any disclaimer, the term of this patent is extended or adjusted under 35 U.S.C. 154(b) by 0 days.

(21) Appl. No.: 16/088,076

(22) PCT Filed: Aug. 23, 2018

(86) PCT No.: PCT/CN2018/101999
§ 371 (c)(1),
(2) Date: Sep. 25, 2018

(87) PCT Pub. No.: WO2019/237508
PCT Pub. Date: Dec. 19, 2019

(65) Prior Publication Data
US 2019/0384115 A1    Dec. 19, 2019

(30) Foreign Application Priority Data
Jun. 15, 2018    (CN) .......................... 2018 1 0620537

(51) Int. Cl.
*G02F 1/13357*    (2006.01)

(52) U.S. Cl.
CPC .. *G02F 1/133605* (2013.01); *G02F 1/133606* (2013.01); *G02F 1/133608* (2013.01); *G02F 1/133611* (2013.01)

(58) Field of Classification Search
CPC ......... G02F 1/133608; G02F 1/133605; G02F 2001/133317; G01F 1/133606
See application file for complete search history.

(56) References Cited

U.S. PATENT DOCUMENTS

2014/0218656 A1* 8/2014 Maruno ............ G02F 1/133608
349/60

FOREIGN PATENT DOCUMENTS

KR    20170035187 A  *  3/2017

* cited by examiner

*Primary Examiner* — Jessica M Merlin
(74) *Attorney, Agent, or Firm* — Mark M. Friedman

(57) ABSTRACT

A liquid crystal display device includes a display panel; a base utilized to support the display panel; and a split-type backlight module disposed corresponding to an incident surface of the display panel. The split-type backlight module includes a backplate, a light source plate, a diffusion plate, and an optical film. Light emitted from the light source plate passes through the diffusion plate and the optical film to form a uniform surface light source projected onto the display panel.

14 Claims, 2 Drawing Sheets

US 10,698,258 B2

LIQUID CRYSTAL DISPLAY DEVICE AND SPLIT-TYPE BACKLIGHT MODULE

CROSS REFERENCE TO RELATED APPLICATIONS

This application is a U.S. National Phase application submitted under 35 U.S.C. § 371 of Patent Cooperation Treaty Application serial No. PCT/CN2018/101999, filed Aug. 23, 2018, which claims the priority of China Patent Application serial No. 201810620537.6, filed Jun. 15, 2018, the disclosures of which are incorporated herein by reference in their entirety.

BACKGROUND OF INVENTION

1. Field of Invention

The present invention relates to a liquid crystal display (LCD), and particularly to an LCD device and a split-type backlight module.

2. Related Art

With improvement of living standards, liquid crystal displays are widely used in varieties of electronic products. Current development of television shows a tendency towards a thinner size in appearance. Compact design can provide selling advantages for products and improve product competitiveness. Because liquid crystal display panels do not self-illuminate and need backlight modules to provide a light source to display image normally, backlight modules have become one of the key components for liquid crystal display devices. Backlight modules in current markets are configured on back sides of display panels and are integrated with the display panels. As a result, thickness of display devices is increased, which is not beneficial to compact design for product appearance. Besides, assembly of the backlight modules and the display panels is complicated, and different size of the display panels are required to match corresponding size of backlight modules, thereby to increase cost. Due to the conventional integral structure, it is more difficult and at higher cost to maintain or repair backlight modules when needed.

Therefore, it is necessary to provide a liquid crystal display device to solve current technical problems.

SUMMARY OF INVENTION

Accordingly, an object of the present invention is to provide a liquid crystal display device and a split-type backlight module capable of realizing compact design for liquid crystal display devices, thereby to simplify maintenance operations, to lower cost, and to improve product competitiveness.

To achieve the above-mentioned objects, a liquid crystal display device of the present invention comprises: a display panel comprising an incident surface; abase utilized to support the display panel, the base comprising a groove, and an edge of the display panel embedded in the groove; a split-type backlight module disposed corresponding to the incident surface of the display panel and spaced apart from the display panel at a predetermined distance; and the split-type backlight module comprising a backplate, a light source plate, a diffusion plate, and an optical film, which are laminated with one another; wherein light emitted from the light source plate passes through the diffusion plate and the optical film to form a uniform surface light source projected onto the display panel, and an edge portion of the display panel is provided with a circuit board disposed in the groove.

In one aspect of the present invention, the base comprises a first supporting portion and a second supporting portion disposed corresponding to the first supporting portion, and the first supporting portion and the second supporting portion are correspondingly movable to be assembled with the display panel.

In one aspect of the present invention, a plurality of fixing structures are provided at intervals to fix the first supporting portion and the second supporting portion.

In one aspect of the present invention, the split-type backlight module further comprises a light collecting plate disposed at a side of the optical film far away from the backplate, the light collecting plate has a structure of two end openings and comprises a plurality of side plates surrounding the optical film, the plurality of side plates are obliquely disposed at a predetermined angle on and surround edges of the optical film, and one of the two end openings adjacent to the optical film is smaller than or equal to the other end opening far away from the optical film. In one aspect of the present invention, In one aspect of the present invention, the plurality of side plates are movably disposed in such a way by adjusting tilting angles of the plurality of side plates to change a projection range that the surface light source is projected onto the display panel.

In one aspect of the present invention, the backplate comprises a bottom and a plurality of side walls surrounding the bottom; the light source plate, the diffusion plate, and the optical film are disposed inside the backplate, and one side of the light collecting plate is disposed on the plurality of side walls.

In one aspect of the present invention, a side of the backplate opposite to the light source plate is provided with a fixing structure, which is utilized to fix the split-type backlight module onto a supporting device.

The present invention further provides a split-type backlight module, utilized to provide a light source for a display panel, the split-type backlight module comprising: a backplate; a light source plate disposed on a surface of the backplate; a diffusion plate disposed on a surface of the light source plate; an optical film disposed on a surface of the diffusion plate; and a light collecting plate disposed on the backplate, the light collecting plate having a structure of two end openings and comprising a plurality of side plates surrounding the optical film, the plurality of side plates are obliquely disposed at a predetermined angle on and surround edges of the optical film, and one of the two end openings adjacent to the optical film is smaller than or equal to the other end opening far away from the optical film; wherein light emitted from the light source plate passes through the diffusion plate and the optical film to form a uniform surface light source projected onto the display panel through the light collecting plate, and the light collecting plate is utilized to adjust a projection range that the surface light source is projected onto the display panel.

In one aspect of the present invention, a side of the backplate opposite to the light source plate is provided with a fixing structure, which is utilized to fix the split-type backlight module onto a supporting device.

The present invention provides a liquid crystal display device, comprising: a display panel comprising an incident surface; a base utilized to support the display panel, the base comprising a groove, and an edge of the display panel embedded in the groove; a split-type backlight module disposed corresponding to the incident surface of the display device and spaced apart from the display panel at a predetermined distance; and the split-type backlight module comprising a backplate, a light source plate, a diffusion plate, and an optical film, which are laminated with one another; wherein light emitted from the light source plate passes through the diffusion plate and the optical film to form a uniform surface light source projected onto the display panel.

In one aspect of the present invention, the base comprises a first supporting portion and a second supporting portion disposed corresponding to the first supporting portion, and the first supporting portion and the second supporting portion are correspondingly movable to be assembled with the display panel.

In one aspect of the present invention, a plurality of fixing structures are provided at intervals to fix the first supporting portion and the second supporting portion.

In one aspect of the present invention, the split-type backlight module further comprises a light collecting plate disposed at a side of the optical film far away from the backplate, the light collecting plate has a structure of two end openings and comprises a plurality of side plates surrounding the optical film, the plurality of side plates are obliquely disposed at a predetermined angle on and surround edges of the optical film, and one of the two end openings adjacent to the optical film is smaller than or equal to the other end opening far away from the optical film.

In one aspect of the present invention, the plurality of side plates are movably disposed in such a way by adjusting tilting angles of the plurality of side plates to change a projection range that the surface light source is projected onto the display panel.

In one aspect of the present invention, the backplate comprises a bottom and a plurality of side walls surrounding the bottom portion; the light source plate, the diffusion plate, and the optical film are disposed inside the backplate, and one side of the light collecting plate is disposed on the plurality of side walls.

In one aspect of the present invention, a side of the backplate opposite to the light source plate is provided with a fixing structure, which is utilized to fix the split-type backlight module onto a supporting device.

DESCRIPTION OF PREFERRED EMBODIMENTS

Figure 1:
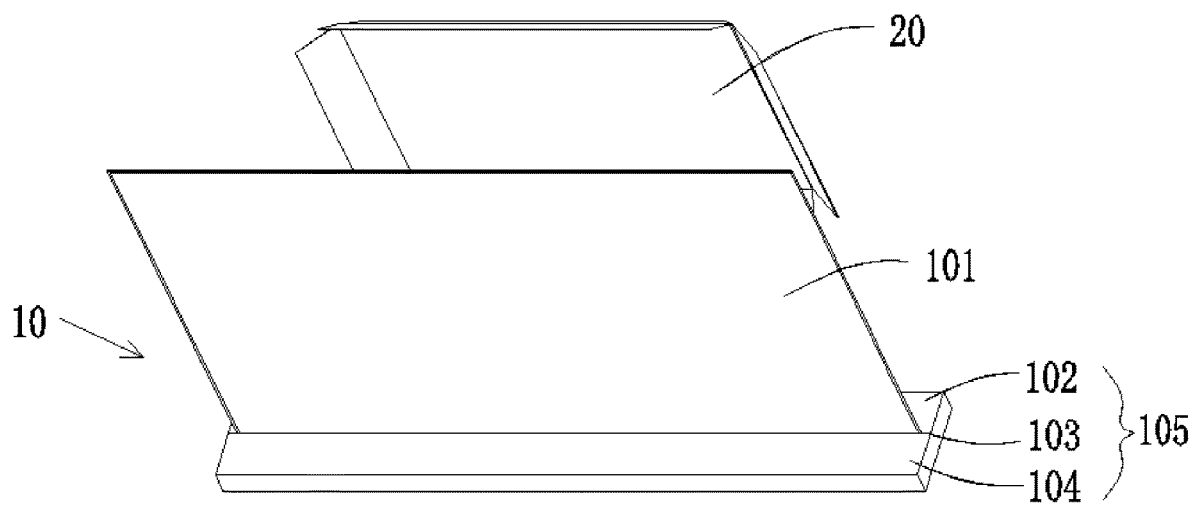
FIG. 1 is a perspective structural view of a liquid crystal display device of the present invention.

The following embodiments are referring to the accompanying drawings for exemplifying specific implementable embodiments of the present disclosure. Furthermore, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, elements with similar structures are labeled with like reference numerals.

The present invention is directed to overcome drawbacks of current liquid crystal display devices. For example, due to integrated structure of liquid crystal display panels and backlight modules, compact design for liquid crystal display devices are limited, and processes of maintenance of backlight modules are more complicated and at higher cost.

FIG. 1 shows a perspective structural view of a liquid crystal display device of the present invention. The liquid crystal display device comprises a television module 10 and a split-type backlight module 20. The television module 10 comprises a display panel 101, the display panel 101 comprising an incident surface; and a base 105 utilized to support the display panel 101. The base 105 comprises a groove 103, and an edge of the display panel 101 is embedded in the groove 103. The base 105 comprises a first supporting portion 102 and a second supporting portion 104 disposed corresponding to the first supporting portion 102. The groove 103 is formed by a gap between the first supporting portion 102 and the second supporting portion 104. The first supporting portion 102 and the second supporting portion 104 are movable in a same direction or in an opposite direction to be assembled with the display panel 101, wherein a plurality of fixing structures are provided at intervals to fix the first supporting portion 102 and the second supporting portion 104, thereby to clamp the display panel 101. The fixing structures are screw components, or spring components and the like, but are not limited thereby.

Alternatively, the base 105 is an integrated structure, wherein the groove 103 is formed on a surface of the base 105, and an edge of the display panel 101 is embedded and embedded into the groove 103 so as to be secured on the base 105. Furthermore, the base 105 can be exemplified by other structure capable of clamping at least two edges of the display panel 101 to fix the display panel 101, wherein detailed descriptions of the base of other structure are not depicted herein. An edge portion of the display panel 101 is provided with a circuit board disposed in the groove 103 to prevent the circuit board from being damaged.

The split-type backlight module 20 is disposed corresponding to the incident surface of the display panel 101 and spaced apart from the display panel 101 at a predetermined distance to provide a light source for the display panel 101. The split-type backlight module 20 comprises a backplate, a light source plate, a diffusion plate, and an optical film, which are laminated with one another. The predetermined distance between the split-type backlight module 20 and the display panel 10 is variable, thereby to provide greater flexibility in arrangement of the split-type backlight module.

Figure 2:
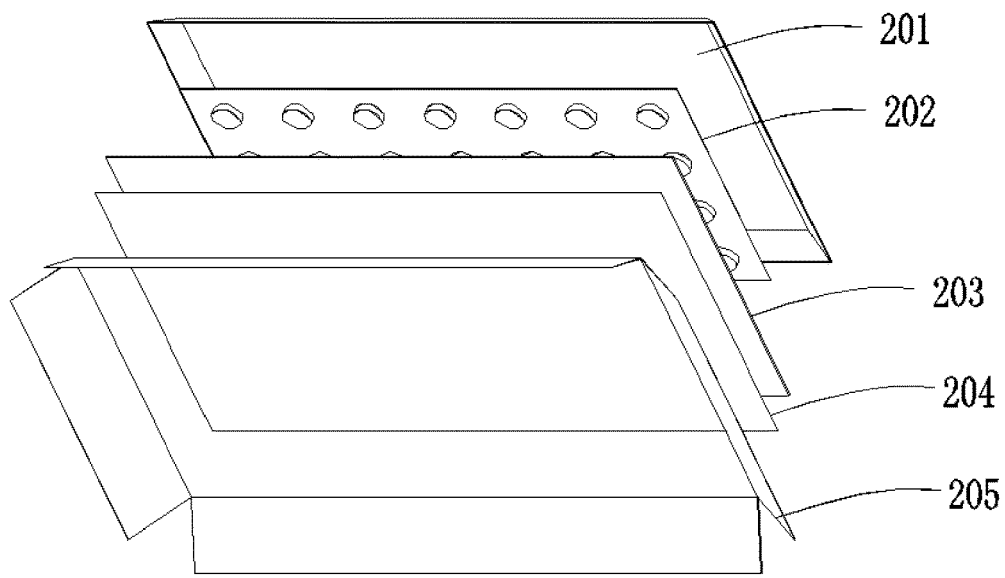
FIG. 2 is an exploded structural view of a split-type backlight module of the present invention.

FIG. 2 shows an exploded structural view of a split-type backlight module of the present invention. The split-type backlight module comprises a backplate 201 comprising a bottom and a plurality of side walls surrounding the bottom. A light source plate 202 is disposed inside the backplate 201 to emit light. A diffusion plate 203 is disposed on a surface of the light source plate 202. An optical film 204 is disposed on a surface of the diffusion plate 203. The light source plate 202 emits light passing through the diffusion plate 203 and the optical film 202 to form a uniform surface light source. A light collecting plate 205 is disposed on a side of the optical film 204 far away from the backplate 201. The light collecting plate 205 comprises a plurality of side plates surrounding the optical film 204 and has a structure of two end openings. The plurality of side plates are obliquely disposed at a predetermined angle on and surround edges of the optical film 204. As shown in FIG. 2, the number of the plurality of side plates of the light collecting plate 205 is four. The four side plates surround the light collecting plate 205 in such a way that the light collecting plate 205 is shaped as a trumpet. One of the two end openings adjacent to the optical film 204 is smaller than or equal to the other end opening far away from the optical film 204. The plurality of side plates are capable of reflecting light emitted towards surroundings from edge portions of the optical film 204. The light collecting plate 205 is configured to project light as much as possible from the light source plate to the display panel 101, thereby to improve light utilization rate and efficiency.

The plurality of side plates are movably disposed on the backplate 201. Because the television module and the split-type backlight module are separately disposed, a distance between the television module and the split-type backlight module is variable. When the distance between the television module and the split-type backlight module is varied, a projection range that the surface light source is projected onto the display panel is changeable by adjusting tilting angles of the plurality of side plates with respect to the optical film 204. Specifically, when the television module is closed to the split-type backlight module, inclined angles of the plurality of side plates with respect to the optical film 204 are enlarged, in such a way that the plurality of side plates tilt inwardly to be perpendicular to the optical film 204, thereby to reduce an emission area of the surface light source allowing light from the surface light source to be exactly projected onto the entire display panel, thereby to improve display effect and to avoid light leakage as well. When the television module is far away from the split-type backlight module, inclined angles of the plurality of side plates with respect to the optical film 204 are reduced, in such a way that the plurality of side plates tilt in a direction parallel to the optical film 204, thereby to enlarge an emission area of the surface light source allowing light from the surface light source to be exactly projected onto the entire display panel, thereby to improve display effect of edges of the display panel. Certainly, the television module and the split-type backlight module are movable within the predetermined distance.

The light source plate 202, the diffusion plate 203, and the optical film 204 are disposed inside the backplate 201. A side of the light collecting plate 205 having the end opening being smaller than the other end opening is disposed on the backplate 201. The backplate 201 is provided to protect internal components of the split-type backlight module from being damaged. A side of the backplate 201 opposite to the light source plate 202 is provided with a fixing structure, which is utilized to fix the split-type backlight module onto a supporting device. The supporting device contains a wall body, or other surfaces of objects, such as a refrigerator, but is not limited thereby.

Figure 3:
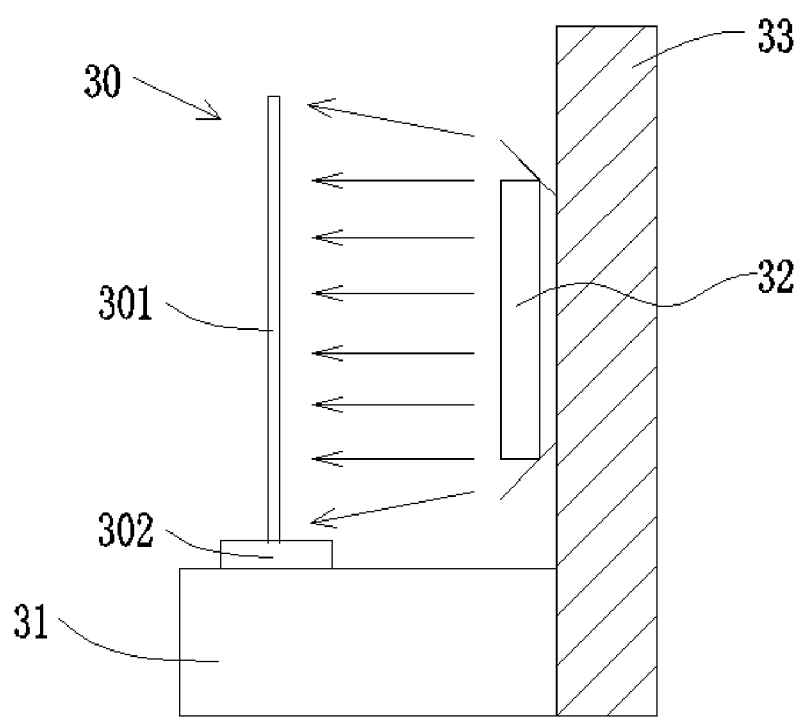
FIG. 3 is a schematic assembly view of the liquid crystal display device of the present invention.

FIG. 3 shows a schematic assembly view of the liquid crystal display device of the present invention. A display panel 301 is disposed on a base 302. The display panel 301 and the base 302 cooperatively form a television module 30. The television module 30 can be placed on a television cabinet. A split-type backlight module 32 and the television module 30 are correspondingly disposed, and the split-type backlight module 32 is embedded onto a surface of a wall body 33. The television module 30 is spaced apart from the split-type backlight module 32 at a predetermined distance. Light emitted from the split-type backlight module 32 is exactly projected on the entire display panel 301. In a side view, the television module 30 is regarded as a television body, which has a thickness same as the display panel 301 (1.5 mm or so), and therefore is capable of realizing compact design for television and is convenient to be maintained or repaired.

The present invention provides the liquid crystal display device and the split-type backlight module which are designed to be separated and standalone structure. The liquid crystal display panel is placed on the television cabinet, and the split-type backlight module is embedded onto the wall body. Viewing from appearance, the liquid crystal display panel and the base are cooperatively formed as a module which can be regarded as a television body having a thickness same as the liquid crystal display panel (1.5 mm or so), thereby is attractive in terms of appearance, and product competitiveness is improved. Due to a split-type design of the liquid crystal display device, a bezel configuration/none bezel configuration of a liquid crystal display panel can be realized. Furthermore, by adjusting inclined angles of the light collecting plate, light emitted from the light source plate is capable of being projected more concentratedly onto the liquid crystal display panel, thereby to improve light utilization rate and efficiency.

It is understood that the invention may be embodied in other forms within the scope of the claims. Thus the present examples and embodiments are to be considered in all respects as illustrative, and not restrictive, of the invention defined by the claims.

What is claimed is:

1. A liquid crystal display device, comprising:
   a display panel comprising an incident surface;
   a base utilized to support the display panel, the base comprising a groove, and an edge of the display panel embedded in the groove;
   a split-type backlight module disposed corresponding to the incident surface of the display panel and spaced apart from the display panel at a predetermined distance; and
   the split-type backlight module comprising a backplate, a light source plate, a diffusion plate, and an optical film, which are laminated with one another, and a light collecting plate disposed at a side of the optical film far away from the backplate, wherein the light collecting plate has a structure of two end openings and comprises a plurality of side plates surrounding the optical film, the plurality of side plates are obliquely disposed at a predetermined angle on and surround edges of the optical film, and one of the two end openings adjacent to the optical film is smaller than or equal to the other end opening far away from the optical film;
   wherein light emitted from the light source plate passes through the diffusion plate and the optical film to form a uniform surface light source projected onto the display panel, and an edge portion of the display panel is provided with a circuit board disposed in the groove.

2. The liquid crystal display device of claim 1, wherein the base comprises a first supporting portion and a second supporting portion disposed corresponding to the first supporting portion, and the first supporting portion and the second supporting portion are correspondingly movable to be assembled with the display panel.

3. The liquid crystal display device of claim 2, wherein a plurality of fixing structures are provided at intervals to fix the first supporting portion and the second supporting portion.

4. The liquid crystal display device of claim 1, wherein the plurality of side plates are movably disposed in such a way by adjusting tilting angles of the plurality of side plates to change a projection area that the surface light source is projected onto the display panel.

5. The liquid crystal display device of claim 1, wherein the backplate comprises a bottom and a plurality of side walls surrounding the bottom; the light source plate, the diffusion plate, and the optical film are disposed inside the backplate, and one side of the light collecting plate is disposed on the plurality of side walls.

6. The liquid crystal display device of claim 5, wherein a side of the backplate opposite to the light source plate is provided with a fixing structure, which is utilized to fix the split-type backlight module onto a supporting device.

7. A split-type backlight module, utilized to provide a light source for a display panel, the split-type backlight module comprising:
   a backplate;
   a light source plate disposed on a surface of the backplate;
   a diffusion plate disposed on a surface of the light source plate;
   an optical film disposed on a surface of the diffusion plate; and
   a light collecting plate disposed on the backplate, the light collecting plate having a structure of two end openings and comprising a plurality of side plates surrounding the optical film, the plurality of side plates are obliquely disposed at a predetermined angle on and surround edges of the optical film, and one of the two end openings adjacent to the optical film is smaller than or equal to the other end opening far away from the optical film;
   wherein light emitted from the light source plate passes through the diffusion plate and the optical film to form a uniform surface light source projecting onto the display panel through the light collecting plate, and the light collecting plate is utilized to adjust a projection area that the surface light source is projected onto the display panel.

8. The split-type backlight module of claim 7, wherein a side of the backplate opposite to the light source plate is provided with a fixing structure, which is utilized to fix the split-type backlight module onto a supporting device.

9. A liquid crystal display device, comprising:
   a display panel comprising an incident surface;
   a base utilized to support the display panel, the base comprising a groove, and an edge of the display panel embedded in the groove;
   a split-type backlight module disposed corresponding to the incident surface of the display device and spaced apart from the display panel at a predetermined distance; and
   the split-type backlight module comprising a backplate, a light source plate, a diffusion plate, and an optical film, which are laminated with one another, and a light collecting plate disposed at a side of the optical film far away from the backplate, wherein the light collecting plate has a structure of two end openings and comprises a plurality of side plates surrounding the optical film, the plurality of side plates are obliquely disposed at a predetermined angle on and surround edges of the optical film, and one of the two end openings adjacent to the optical film is smaller than or equal to the other end opening far away from the optical film;
   wherein light emitted from the light source plate passes through the diffusion plate and the optical film to form a uniform surface light source projected onto the display panel.

10. The liquid crystal display device of claim 9, wherein the base comprises a first supporting portion and a second supporting portion disposed corresponding to the first supporting portion, and the first supporting portion and the second supporting portion are correspondingly movable to be assembled with the display panel.

11. The liquid crystal display device of claim 10, wherein a plurality of fixing structures are provided at intervals to fix the first supporting portion and the second supporting portion.

12. The liquid crystal display device of claim 9, wherein the plurality of side plates are movably disposed in such a way that angles of the plurality of side plates are capable of being adjustable to change a projection range that the surface light source is projected onto the display panel.

13. The liquid crystal display device of claim 9, wherein the backplate comprises a bottom and a plurality of side walls surrounding the bottom, and the light source plate, the diffusion plate, and the optical film are disposed inside the backplate, one side of the light collecting plate disposed on the plurality of side walls.

14. The liquid crystal display device of claim 13, wherein a side of the backplate opposite to the light source plate is provided with a fixing structure, which is utilized to fix the split-type backlight module onto a supporting device.

* * * * *